United States Patent [19]

Morud

[11] Patent Number: 4,891,706

[45] Date of Patent: Jan. 2, 1990

[54] ANALOG AND DIGITAL VIDEO DISPLAY SYSTEM

[75] Inventor: Gregory L. Morud, Cedar Rapids, Iowa

[73] Assignee: Rockwell International Corporation, El Segundo, Calif.

[21] Appl. No.: 324,288

[22] Filed: Mar. 15, 1989

[51] Int. Cl.$^4$ .......................... H04N 5/14; H04N 5/33
[52] U.S. Cl. ..................................... 358/184; 358/113; 330/59; 330/147; 375/5; 370/119
[58] Field of Search ................. 358/113, 184; 330/59, 330/147, 308; 375/5; 370/119

[56] References Cited

U.S. PATENT DOCUMENTS

| | | | |
|---|---|---|---|
| 3,982,197 | 9/1976 | Schade, Jr. | 330/59 |
| 4,377,860 | 3/1983 | Godbole | 375/5 |
| 4,524,386 | 6/1985 | Scott | 358/113 |
| 4,608,599 | 8/1986 | Kaneko et al. | 388/113 |
| 4,679,068 | 7/1987 | Lillquist et al. | 358/113 |
| 4,729,039 | 3/1988 | Clark | 358/484 |
| 4,759,072 | 7/1988 | Yamane et al. | 358/113 |

OTHER PUBLICATIONS

TWR Catalog.

*Primary Examiner*—John K. Peng
*Attorney, Agent, or Firm*—Gregory G. Williams; M. Lee Murrah; H. Fredrick Hamann

[57] ABSTRACT

A video display system having a forward locking infrared sensor which emits a linear video signal together with a digital graphics generator which generates digital video signals in a plurality of colors; together with a signal video amplifier for amplifying both the linear signal and the high data rate digital signal; the video amplifier having a plurality of curent regulators for regulating the current through a particular resistor where the current regulation is a function of the received linear and digital video signals; the video amplifier also having the capability of current regulation through the resistor in response to variations in the voltage source voltage and thereby eliminating the need for an additional power source voltage regulator.

5 Claims, 1 Drawing Sheet

ANALOG AND DIGITAL VIDEO DISPLAY SYSTEM

FIELD OF THE INVENTION

This invention relates to video CRT display systems, and more particularly concerns such systems which display signals from both digital and linear sources, and even more particularly, is concerned with a dual mode video CRT display system that has the capability of self compensation for variations in power supply voltage.

BACKGROUND OF THE INVENTION

In some applications it is desirable to have a video display system which is capable of displaying information received from sources which have both linear and digital signals. One example of such a display system is in the use of forward looking infrared sensors aboard search and rescue helicopters to assist in the detection of lost persons. In such systems the forward looking infrared detectors have typically a single linear monochromatic signal, while the graphics which are displayed on the same display screen, come from a source with three color digital signals.

In the past, there have been both linear video amplifiers for amplifying linear video signals and digital video amplifiers for amplifying digital video signals. Normally, these video amplifiers are not able to perform with input signals that have both linear and digital components. The digital amplifiers are only able to operate at certain preselected discrete output levels and thereby are unable to amplify linear video signals. The linear amplifiers of the past have typically operated at a slow frequency and were unable to handle the very high data rates typically associated with digital video signals. As a result, it has been difficult to use a single video amplifier to amplify both linear signals and high frequency digital signals.

One approach has been used in the past which includes a very high speed linear video amplifier which is able to accommodate the high frequency digital signals as well as the linear signals.

While such a system, or variations of it, have enjoyed some use in the past, it does have several serious drawbacks. First of all, a linear amplifier that operates at a sufficiently high frequency to handle the typical digital video data rates is usually higher in cost than a digital amplifier or a low frequency linear amplifier. Secondly, such high speed linear video amplifiers have an additional cost in that they consume more power than a low frequency linear amplifier.

Consequently, there exists a need for improvement in video amplifiers which are able to amplify a video signal which has both a linear and a high data rate digital video component.

SUMMARY OF THE INVENTION

It is an object of the present invention to provide a dual mode video amplifier which is capable of amplifying a linear signal as well as a digital signal at high data rates.

It is a feature of the present invention to use a video amplifier having dual current controls therein.

It is an advantage of the present invention to provide a lower cost, lower power consumption video amplifier.

It is another feature on the present invention to use a quiescent current through one of the current controls.

It is another advantage of the present invention to eliminate the need for an external power supply voltage regulator.

The present invention provides a dual mode video amplifier system which is designed to satisfy the aforementioned needs, produce the earlier propounded objects, contain the above described features, and achieve the previously stated advantages. The invention is carried out in a "high frequency linear amplifier less" system, in the sense that a very high frequency linear amplifier is not used. Instead, a single video amplifier is used which has separate current controls therein for linear signals and for high speed digital signals.

Accordingly, the present invention relates to a video system which includes a linear signal source, a high data rate digital signal source, and a single video amplifier with separate current controls therein.

BRIEF DESCRIPTION OF THE DRAWINGS

The invention may be more fully understood by reading the following description of the preferred embodiments of the invention in conjunction with the appended drawings wherein.

DETAILED DESCRIPTION

Figure 1:
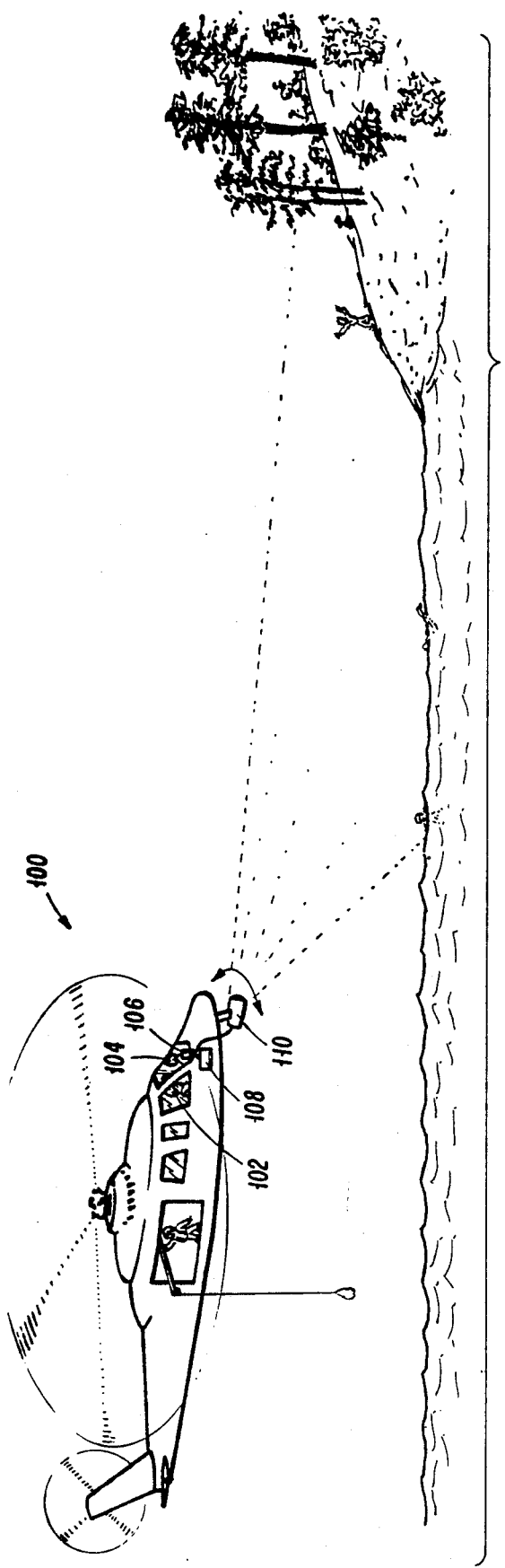
FIG. 1 is a pictorial representation of the video display system of the present invention use in a typical environment.

Now referring to the drawings and more particularly to FIG. 1 where there is shown a search and rescue helicopter generally designated 100 having a pilot 102 therein viewing a display screen 104. Display screen 104 is shown having a single video amplifier 106 and two signal sources which include a digital graphics generator 108 and a forward looking infrared sensor 110 which generates a linear signal. The forward looking infrared sensors are swept in several directions to scan the surface of the earth and are able to detect points of increased emission of infrared radiation. Persons located in the sea or on land will typically emit more infrared radiation than their surroundings thereby facilitating their rescue. Graphic information is generated in the graphic generator 108 and displayed together with the information from the forward looking infrared sensors.

Figure 2:
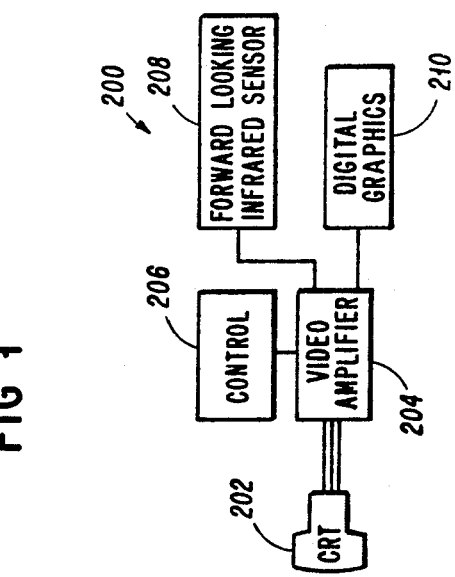
FIG. 2 is a block diagram representation of the components of the video display system of the present invention.

Now referring to FIG. 2, there is shown a block diagram of the video display system of the present invention generally designated 200 which includes a display device 202 having a single video amplifier 204 coupled therewith. The video amplifier is shown coupled with a display controller 206 for controlling various functions of the video amplifier. Forward looking infrared sensor 208 is shown coupled with video amplifier 204. Forward looking infrared video sensor typically emits a single linear video signal. Digital graphics generator 210 is shown coupled with video amplifier 204. Generator 210 typically generates three color digital signals.

Figure 3:
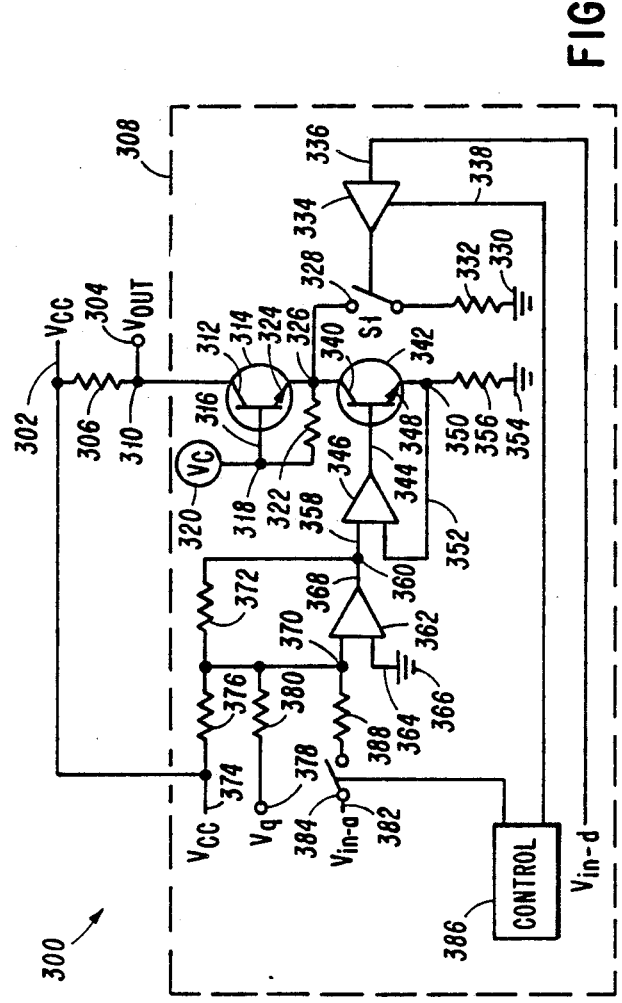
FIG. 3 is a detailed schematic diagram of a preferred embodiment of the present invention.

Now referring to FIG. 3, there is shown a video amplifier which is a preferred embodiment of the present invention and is generally designated 300. Voltage $V_{cc}$ is applied to node 302 from an external voltage power source (not shown). The output voltage of the video amplifier 300 is taken from tap 304 which is separated from node 302 by resistor 306. The output voltage $V_{out}$ is a function of the input voltage $V_{cc}$ and the current through resistor 306. The circuitry inside intermittent line 308 performs the function of controlling the current through resistor 306 and thereby performs the function of modulating the output signal in response to the video input signals. Node 310 is coupled with the collector 312 of NPN bipolar transistor 314 having its base 316 coupled to node 318 which is coupled to a reference voltage 320. Node 318 is coupled through resistor 322 to the emitter 324 of transistor 314, at node 326. Node 326 is coupled to switch 328. Switch 328 links reference voltage 330 to node 326 through resistor 332. Switch 328 is controlled by operational amplifier 334 which is preferably a high gain, high speed operational amplifier or a high speed comparator which receives signals on lines 336 and 338. The signal of line 336 is a high data rate digital signal. Node 326 is coupled with collector 340 of NPN bipolar transistor 342 which has its base 344 coupled with operational amplifier 346. Transsistor 342 has its emitter 348 coupled to node 350 which is linked by line 352 to operational amplifier 346. Node 350 is separated from reference voltage 354 by resistor 356. Line 358 couples operational amplifier 346 with node 360. Operational amplifiers 346 and 362 are preferably high speed Op-Amps. Operational amplifier 362 is coupled through line 364 to reference voltage 366 and further coupled through line 368 to node 360. Operational amplifier 362 is coupled to node 370. Node 370 is separated from node 360 by resistor 372. Power supply voltage $V_{cc}$ at node 374 is coupled through scaling resistor 376 to node 370 while quiescent voltage $V_q$ at node 378 is coupled through resistor 380 to node 370. Linear video analog voltage input signal $V_{in-a}$ at node 382 is selectively connected through switch 384 and resistor 388 to node 370. Switch 384 is coupled with display controller 386 which is coupled to operational amplifier 334 by line 338.

In operation, the video amplifier of the present invention is accomplished by selectively manipulating the current through resistor 306 and thereby selectively manipulating the voltage drop from $V_{cc}$ at node 302 to the output voltage $V_{out}$ at node 304. This selective manipulation of current through resistor 306 is performed by selectively manipulating the current through resistors 356 and 332. When switch 328 is closed by operational amplifier 334, current is allowed to flow through resistor 332 to reference voltage 330. This current through resistor 332 will increase the current through resistor 306. The switch 328 is operated in response to an output from operational amplifier 334 which has inputs from display controller 386 and also from the digital video input signal $V_{in-d}$. However, when the switch 328 is open and thereby no current flows through resistor 332 and consequently no digital video signals are used, the current through resistor 306 is controlled by the current through resistor 356. The current through resistor 356 is controlled by operational amplifier 346. A quiescent current $I_q$ is caused to flow through resistor 356 to reference voltage 354 in normal operations and is accomplished by $V_q$, resistors 380 and 372 and operational amplifier 362. This quiescent current enables transistor 342 to be active at all times and allows it to respond quickly. Quiescent current $I_q$ would normally cause a small current through resistor 306 that would cause a voltage drop across resistor 306, lowering the quiescent voltage potential at node 310. Instead, a quiescent current is made to flow through resistor 322 that is nearly equal in magnitude to $I_q$. This current stops the quiescent current in resistor 356 from generating the similar current in resistor 306, thus the output quiescent voltage $V_{out}$ is not penalized.

Because $V_{out}$ is controlled by $V_{cc}$ and the current through resistor 306, any variations in $V_{cc}$ will cause an unwanted scaled variation in $V_{out}$. The need for a separate external power supply voltage regulator (not shown) is eliminated by selectively manipulating the current in resistor 356 in response to the power supply voltage variations. This is accomplished by $V_{cc}$, resistors 376 and 372 and operational amplifier 362.

The voltage $V_{in-a}$ at line 382 manipulates the voltage through current 356 in a manner similar to the manipulation of the current through resistor 356 in response to the variations in the voltage $V_{cc}$. This manipulation of the current through resistor 356 is accomplished by $V_{in-a}$, the switch 384, which is selectively controlled by control 386, resistor 388 and operational amplifier 362. The switch 384 is controlled by control 386 so that no current flows through resistor 388 when switch 328 is in a closed position.

It is thought that the video amplifier of the present invention and many of its attended advantages will be understood from the foregoing description, and it will be apparent that various changes maybe made in the form, construction, and arrangements of the parts thereof without departing from the spirit and scope of the invention or sacrificing all of their material advantages. The forms herein before being merely preferred or exemplary embodiments thereof. It is the intention of the appended claims to cover all of such changes.

I claim:

1. A video display system comprising:
   a linear video signal source for generating a linear video signal in response to some external stimuli;
   a digital video signal source, for outputting a digital video signal in response to some external stimuli;
   a video amplifier coupled with said linear video source and said digital video source for amplifying the linear video signal and the digital video signal and thereby generating an amplified linear video signal and an amplified digital video signal;
   said video amplifier having a resistor, a first means for controlling current through said resistor in response to a linear video signal, and a second means for controlling current through said resistor in response to a digital video signal;
   a cathode ray tube coupled with said video amplifier for displaying information in response to the amplified linear video signal and the amplified digital video signal.

2. A video display system of claim 1 wherein said linear video signal source comprises a forward looking infrared detector, for detecting infrared radiation incident thereon and outputting a linear video signal in response thereto.

3. A video display system of claim 2 wherein said digital video source comprises a color graphics generator which outputs a plurality of high data rate digital signals in response to some external stimuli.

4. A dual mode video amplifier for amplifying both linear signals and digital signals, the amplifier comprising:
   a voltage source;
   an amplifier signal output;
   a resistor coupled with said voltage source and said amplifier signal output for reducing the voltage between the voltage source and the amplifier signal output;
first means for controlling the current through said resistor in response to an input linear signal;
second means for controlling the current through said resistor in response to an input digital signal; and
means for controlling the current through the resistor in response to variations in the voltage source voltage.

5. A video display system comprising:

a forward looking infrared detector, which senses the reception of infrared radiation and outputs a linear video signal in response to the received infrared radiation;

a color graphics generator, which generates a high data rate digital signal in a plurality of colors, for displaying graphic and textual information on a video screen;

a cathode ray tube for displaying information in response to a received amplified video signal;

a video amplifier coupled with said forward looking infrared detector, said color graphic generator and said cathode ray tube for amplifying the linear video signal and the digital video signals and outputting an amplified video signal to the cathode ray tube;

a controller for switching the input to the video amplifier between the forward looking infrared detector and the color graphics generator;

said video amplifier having a voltage source, and amplifier signal output, a resistor coupled with said voltage source and said amplifier signal output for reducing the voltage between the voltage source and the amplifier signal outputs, a first means for controlling the current through said resistor in response to an input linear signal from said forward looking infrared detector, a second means for controlling the current through said resistor in response to an input digital signal from said color graphics generator, and means for controlling the current through the resistor in response to variations in the voltage source voltage.

* * * * *